(12) United States Patent
Dubyak et al.

(10) Patent No.: US 10,891,324 B2
(45) Date of Patent: Jan. 12, 2021

(54) WEIGHTING OF UNOBSERVED TERMS IN A LANGUAGE MODEL FOR INFORMATION RETRIEVAL USING LEXICAL RESOURCES

(71) Applicant: International Business Machines Corporation, Armonk, NY (US)

(72) Inventors: William G. Dubyak, Severna Park, MD (US); Edward G. Katz, Washington, DC (US); Brian L. Keith, Leesburg, VA (US); Nicole O'Connor, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/137,895

(22) Filed: Sep. 21, 2018

(65) Prior Publication Data

US 2020/0097599 A1    Mar. 26, 2020

(51) Int. Cl.
*G06F 7/00*        (2006.01)
*G06F 16/33*       (2019.01)
*G06F 16/338*      (2019.01)
*G06F 40/284*      (2020.01)

(52) U.S. Cl.
CPC ........ *G06F 16/3334* (2019.01); *G06F 16/338* (2019.01); *G06F 40/284* (2020.01)

(58) Field of Classification Search
CPC ... G06F 16/3334; G06F 16/338; G06F 40/284
USPC .................................................. 707/600–899
See application file for complete search history.

(56) References Cited

U.S. PATENT DOCUMENTS

| 9,317,559 | B1 | 4/2016 | Blair-Goldensohn |
| 9,430,461 | B2 | 8/2016 | Baughman |
| 2008/0052289 | A1* | 2/2008 | Kolo ..................... G06F 16/319 |
| 2016/0103837 | A1 | 4/2016 | Lee |
| 2016/0232238 | A1 | 8/2016 | Sweeney |

OTHER PUBLICATIONS

Peter Mell, "The NIST Definition of Cloud Computing," Special Publication 800-145; pp. 1-7, Sep. 2011.

* cited by examiner

*Primary Examiner* — Isaac M Woo
(74) *Attorney, Agent, or Firm* — Ingrid M Foerster; Otterstedt, Wallace & Kammer, LLP (57) ABSTRACT

A method of retrieving information includes obtaining access to a plurality of documents comprising document terms, receiving a lexicon including a plurality of lexical terms, receiving a query, identifying a plurality of search terms in the query by decomposing the query, determining at least one match of the search terms to the lexical terms, determining a plurality of matches of the search terms to the document terms, and scoring each of the documents based on the at least one match to the lexical terms and the matches to the document terms.

18 Claims, 6 Drawing Sheets

WEIGHTING OF UNOBSERVED TERMS IN A LANGUAGE MODEL FOR INFORMATION RETRIEVAL USING LEXICAL RESOURCES

BACKGROUND

The present disclosure relates generally to document retrieval and more particularly to an improved document retrieval including biasing the assignment of probability to unobserved words in a language model used for ranking documents in favor of terms included in a lexicon.

Typically, information retrieval (e.g., retrieval of documents) requires a smoothing function for statistical language models that attempts to match documents and queries. Smoothing helps improve scoring by correcting for sparseness in collection documents. These models are based on the assumptions that both the document and the query are generated by a common language model that assigns probability to each word. At search, the models approach this process from the perspective of estimating the probability that a given document would have generated the query:

$$P(q|d)$$

Each query word matched by the document increases the probability that d is relevant to q. The model estimates the probability that, if starting with a particular document, a particular query would be encountered. Higher scores influence the order in which documents are presented.

It is inevitable that a relevant document will occasionally fail to match a query word; this is the problem of sparseness. For example, in a case of an abstract of a scholarly journal, where the query word is not included in the brief summary, but is likely in the main document. Language models compensate for sparseness through a process called smoothing. Smoothing steps beyond word counting to compensate for occasional omission of a relevant word. To avoid assigning zero probability to such words, some of the probability mass in the models is shifted from seen to unobserved (but likely relevant) words. Typically, this assignment of probability to unobserved words is a function of the distribution of words within the collection of documents. For example:

$$P(q|d) > 0$$

even if:

$$c(w,d) = 0$$

In smoothed language models the total score assigned to a document is a sum of seen and unobserved query words in the document.

SUMMARY

A method of retrieving information includes obtaining access to a plurality of documents comprising document terms, receiving a lexicon including a plurality of lexical terms, receiving a query, identifying a plurality of search terms in the query by decomposing the query, determining at least one match of the search terms to the lexical terms, determining a plurality of matches of the search terms to the document terms, and scoring each of the documents based on the at least one match to the lexical terms and the matches to the document terms.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:
 a smoothing function using lexical information applied in a natural language processing context enabling a computer to rank documents; and
 the ranking of documents based on a collection of probabilities adjusted for terms in lexicon.

These and other features and advantages of the present invention will become apparent from the following detailed description of illustrative embodiments thereof, which is to be read in connection with the accompanying drawings.

BRIEF DESCRIPTION OF THE OF THE DRAWINGS

Preferred embodiments of the present invention will be described below in more detail, with reference to the accompanying drawings.

DETAILED DESCRIPTION

Embodiments of the present invention are directed to an improved information retrieval method. According to an embodiment of the present invention, during automated an information retrieval task, electronic documents are ranked according to the terms appearing in each document and a probabilistic match of query terms unobserved in the documents. According to an embodiment of the present invention, the terms associated with the electronic documents—including one or more unobserved terms—are weighted and used in scoring the documents. In at least one exemplary embodiment, the weighted terms increase a probability of relevant documents being returned by the information retrieval task. Exemplary embodiments of the present invention improve conventional techniques through application of a smoothing method in the information retrieval task that matches unobserved terms to one or more of the documents as a function of a constant, and which alters an impact of the matched unobserved terms as a function of document length, such that the documents are ranked based at least in part on the matched unobserved terms, which increases a probability of relevant documents being returned by the information retrieval task.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
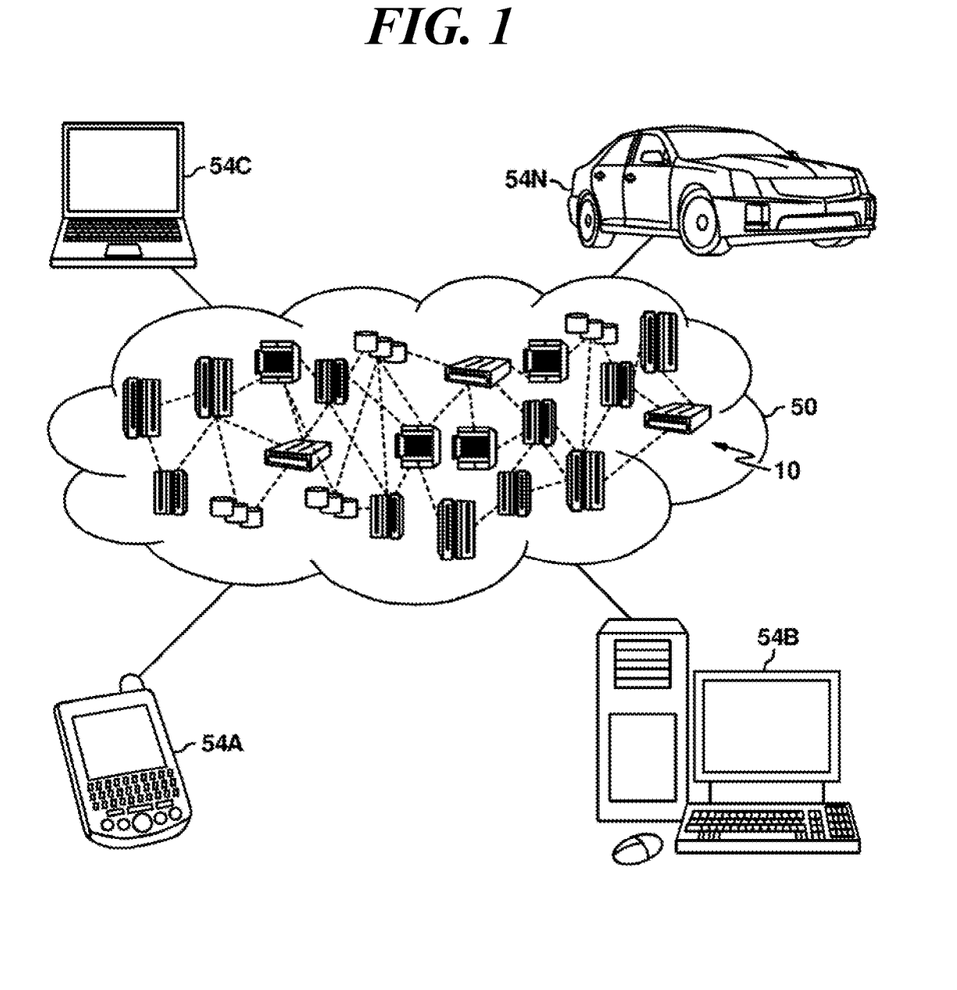
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
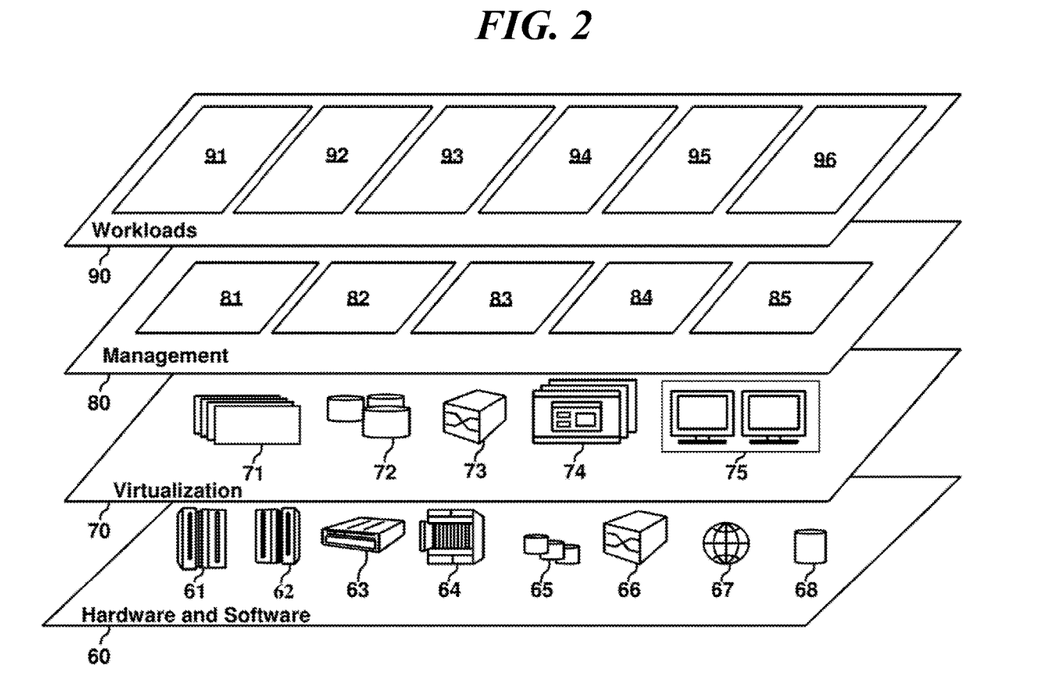
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and information retrieval with a smoothing function using a lexicon 96.

According to an embodiment of the present invention, an improved information retrieval method uses a language model including lexical information, for example, as part of a natural language processing (NLP) system.

According to an embodiment of the present invention, a lexicon is a collection of terms. Embodiments of the present invention improve conventional methods of statistical smoothing in language models, which rely on weights determined entirely by the distribution of terms within a collection (i.e., which assign a weight of zero to an unmatched term in the collection), by upweighting lexical terms in a language model. According to at least one embodiment of the present invention, weights on terms that are included in a user lexicon are selectively increased.

According to at least one exemplary embodiment of the present invention, including weighted terms as a factor in calculating smoothed weights for unobserved terms is a substantially cost-free step, at least because the user lexicon is specified for independent reasons, and the information is available for secondary purposes within the search engine. According to an embodiment of the present invention, a method of unigram weighting can extend to complex language modeling schemes.

In one or more embodiments of the present invention, the lexicon is provided by a user, provided by a subject matter expert configuring the system, or generated automatically from a corpus of documents via lexicon extraction techniques. According to at least one embodiment of the present invention, the lexical terms are extracted from logs based on previous searches or online activity (e.g., using cookies). According to at least one embodiment of the present invention, the lexicon is associated with a user's online profile available to the NLP system (e.g., a search engine).

According to an embodiment of the present invention, the lexicon is part of an NLP configuration; the terms in the lexicon provide insight into user priorities where the lexicon is a collection of terms—user centric domain terminology—to which the user has already attached relevance (e.g., by providing or selecting certain terms). According to an embodiment of the present invention, the NLP system is configured with the lexicon for use in parsing inputs or identifying and classifying domain terminology.

According to at least one exemplary embodiment of the present invention, an improved information retrieval method includes assigning a small probability to the query term based on its behavior within a collection of documents. The assigned probability shifts some of the probability mass from observed to unobserved terms, where there is reason to believe that the unobserved terms are relevant to the query. The importance of unobserved terms in a document's final score is a function of the sum of observed and unobserved terms, and a document specific weight that adjusts the impact of unobserved terms. For example, in the context of the document specific weight, shorter documents typically receive more of their relevance score from unobserved terms based on an assumption that, had the author continued writing, the author likely would have chosen to use the unobserved terms. In longer documents this assumption breaks down and the observed terms are more dominant in the final document score.

Term distributions within a collection of documents is the conventional mechanism for assigning weights to unobserved terms; the term distributions with the collection are preferred to distributions within the language, because relevant terms of art will be given a greater significance in the smoothing process.

According to at least one exemplary embodiment of the present invention, in the interest of finding the most relevant documents, the information contained in the domain lexicon is used to give an additional boost to q terms unobserved in d documents, but included in the lexicon. Since, in at least one embodiment, the user has taken an affirmative step to flag these terms as particularly important in the domain, embodiments of the present invention boost the document score when the term is in the user query but not in a document that is determined to be otherwise relevant. Accordingly, embodiments of the present invention make use of a more specific vocabulary as compared to a generic collection vocabulary.

Embodiments of the present invention are neutral across language models and are extensible across multiple language models.

Figure 3:
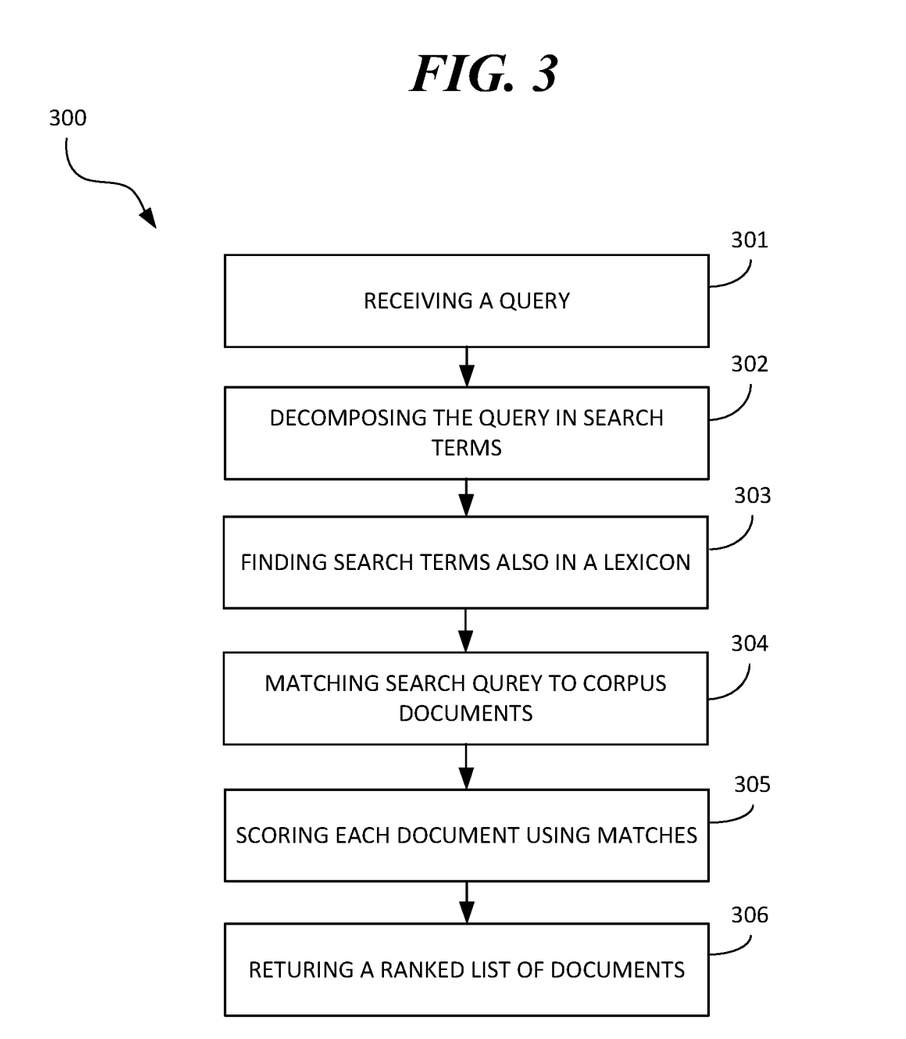
FIG. 3 is a flow diagram of an information retrieval method according to an exemplary embodiment of the present invention.

According to at least one exemplary embodiment of the present invention and referring to FIG. 3, given a document collection C including a number of individual documents and a lexicon L including a set of domain terms, a method 300 of scoring the documents includes receiving a query q 301 and decomposing the query q to identify one or more search terms (e.g., $w_1, w_2, \ldots, w_n$) in the query 302. The method further includes determining which search terms in the query are also in the domain lexicon L 303, matching each search query to documents in the collection 304. For each search term w and document d, a match is determined if:

a. document d has search term w;

b. document d omits search term w, but search term w is contained within collection C; or c. document d omits search term w, but search term w is contained within collection C AND search term w is also contained within lexicon L.

The method further includes scoring each document d in C 305 in accordance with the matches from block 304. This score will be influenced by, for example, the number of matched query terms in document; the number of query terms unobserved in d but contained in C; the number of unobserved terms in d but contained in L; and a length of d to govern impact of unobserved terms. The method further includes returning a ranked list of documents based on the score determined in the matching 306. According to one or more embodiments of the present invention, block 306 includes, for example, presenting (e.g., displaying) a portion of the ranked list of documents (e.g., the top five ranked documents based on the respective scores) to a user. According to at least one exemplary embodiment of the present invention, block 306 returns the ranked list to a larger pipeline (e.g., an application providing the query and receiving the ranked list).

Embodiments of the present invention are applicable to NLP-driven systems where the user has specifically input a domain lexicon for annotation, scoring, and entity extraction.

According to at least one exemplary embodiment of the present invention, during an information retrieval at search time, scoring is enabled such that any term that is IN the query but OMITTED from a particular document is given a small weight commensurate with its position in the collection. In at least one exemplary embodiment, the weight is based on term frequency within the collection and applied through well-known metrics such as TF-IDF (term frequency-inverse document frequency).

According to at least one exemplary embodiment of the present invention, if the omitted (unobserved) term is also in the lexicon, its collection weight is multiplied by a constant. In at least one exemplary embodiment, the constant is derived experimentally or is a user-configurable option.

According to at least one exemplary embodiment of the present invention, all probabilities over all possible events (in this case a particular term occurring in the collection) sum to one, the constant is applied to the collection weight of the omitted term before the final probability distribution is calculated. In effect, the constant this shifts weight from all collection terms to terms in the lexicon.

According to at least one exemplary embodiment of the present invention, the relevance of document is determined based on collection probabilities adjusted for those terms included in lexicon.

Note that, since a language model is collected for each document in the collection, a weighting—of matched observed terms and of matched unobserved terms—according to at least one exemplary embodiment of the present invention has a unique impact for each document. According to at least one exemplary embodiment, an overall impact of the weighting on a document score will be a function of document length, since language models compensate for document length using a smoothing method; the final impact of the weighting is not a constant.

Figure 4:
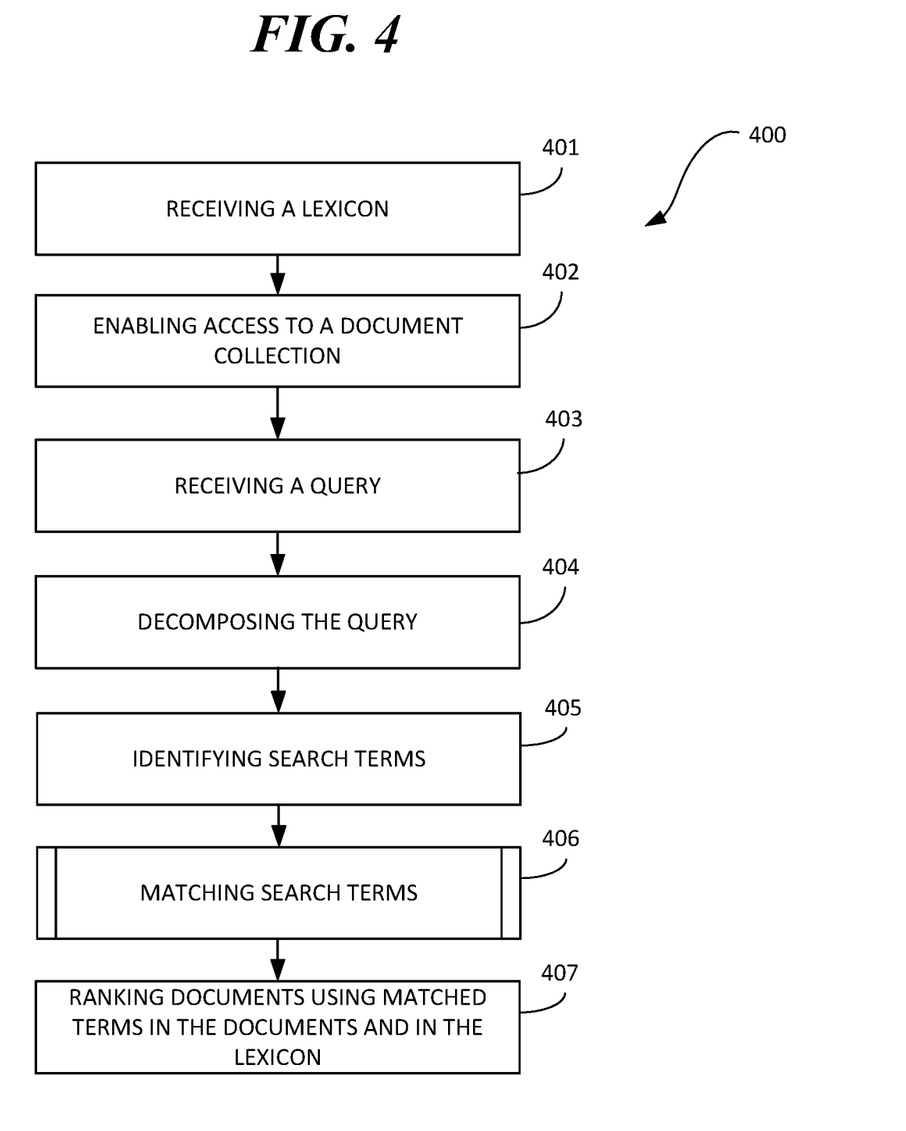
FIG. 4 is a flow diagram of an information retrieval method according to an exemplary embodiment of the present invention.
Figure 5:
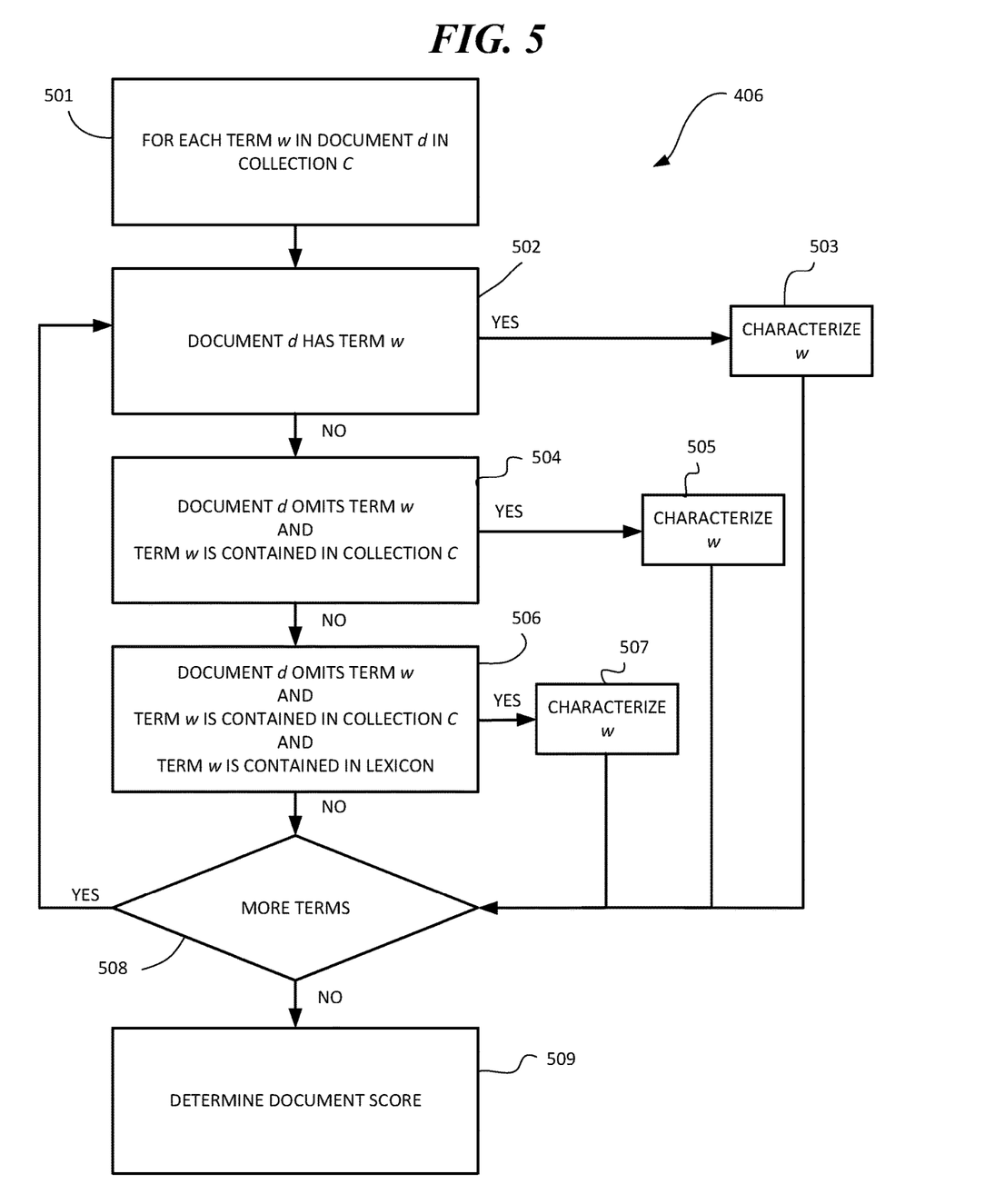
FIG. 5 is a flow diagram of a smoothing function according to an exemplary embodiment of the present invention.

According to at least one exemplary embodiment of the present invention and referring to FIG. 4, in a method for returning ranked documents 400 a domain lexicon L={"delivery", "shipping"} is provided 401 and access to a document collection is enabled 402, wherein the document collection C includes three short documents: C={"Radio and TV delivery are slow", "Radio sound is good", "TV delivery is slow"}. The method includes receiving an input query q 403, decomposing the query q 404 and identifying search terms 405. For example, a query "radio delivery" is decomposed and terms "radio" and "delivery" are identified as search terms. The method further comprises matching the search terms to the domain lexicon and documents 406. At block 406, the method includes determining which search terms are also in the domain lexicon L. For example, "delivery" is identified as being in the domain lexicon L. At block 406, the method further comprises identifying one or more of the documents in collection C that match each of the query terms. In at least one embodiment, this is done by searching for each query term in an index of the document collection to identify documents indexed by that term. Referring to FIG. 5, at block 406, for each term w and document d 501 (508), a match is determined if:

a. document d has term w 502, for example, a first document contains "radio" and "delivery" and a third document contains "delivery";

b. document d omits term w AND term w is contained within collection C 504, for example, the third document doesn't contain "radio", but "radio" is in the collection (in the other two documents); or c. document d omits term w, AND term w is contained within collection C AND term w is also contained within lexicon L 506, for example, "delivery" is not in the second document, but it is in the collection, in the third document, and it is in the lexicon.

The method further comprises storing each document in the collection in accordance with matches from block 406. According to at least one exemplary embodiment of the present invention, for each document d, this score is influenced by:

a. a number of matched query terms in document 503;

b. a number of query terms unobserved in d but contained in C 505;

c. a number of unobserved terms in d but contained in L 507; and d. a length of d to govern impact of unobserved terms.

In at least one exemplary embodiment, the score 509 is calculated according to the following equation, where $\alpha_d$ is the document dependent smoothing constant and $\beta_q$ is the lexicon multiplier for the term q (either 1 if q is not in the lexicon or >1 if q is in the lexicon):

$$\log p(q \mid d) = \sum_{i:c(q_i;d)>0} \log \frac{p_s(q_i \mid d)}{\alpha_d \beta_{q_i} p(q_i \mid C)} + \sum_{i=1}^{n} \log \alpha_d \beta_{q_i} \quad \text{Eq(1)}$$

In Equation (1) the numerator, $p_s(q_i|d)$ is the distribution of observed terms $p_s$ (s indicating seen or observed) over terms in the query that appear in the document (for example, calculated as the count of term $q_i$ in document divided by the count of all words in the document d). In the denominator, the impact of terms identified as unobserved in the document and contained in the collection C is the collection-determined weight $p(q_i|C)$ multiplied by the document depending smoothing constant $\alpha_d$ and the lexicon multiplier $\beta_q$. For example, $\beta_q=2$ for a term q in lexicon (i.e., for a term omitted in the document, contained in the collection and contained in the lexicon).

According to at least one exemplary embodiment of the present invention, the process of borrowing strength from the lexicon has a different impact in different domains. Accordingly, the impact of the lexicon is a user configurable option, for example, which is tuned empirically. Intuitively, just as a document that fails to contain a term which is frequent in the collection is penalized—in a document-length dependent way—, so too is a document that fails to contain a term which is in the lexicon penalized—in a document dependent way—for this.

Stated another way, according to at least one embodiment of the present invention, the scoring of each of the documents 509 comprises adjusting a weighted score of a given one of the documents by a first value upon determining that the given document includes a given one of the search terms, by a second value upon determining that the given document omits the given one of the search terms and the given one of the search terms is contained in at least one of the documents, or by a third value upon determining the given document omits the given one of the search terms and the given one of the search terms is contained in at least one of the documents and contained in the lexicon, where the first value is greater than the second value and the third value, and the third value is greater than the second value.

The method further comprises returning a ranked list of documents 407. For example, using the exemplary metrics above on the example query, lexicon, the documents in the example collection would be ranked as follows for the query "radio delivery":

"Radio and TV delivery are slow" (two hits);

"TV delivery is slow" (one hit, one non-domain terms miss); and

"Radio sound is good", (one hits, one domain term miss). Note that the document that does not contain the domain term in the query is ranked lower than the document that fails to contain a term that is not a domain term.

Recapitulation:

A method of retrieving information includes obtaining access to a plurality of documents comprising document terms 402, receiving a lexicon including a plurality of lexical terms 401, receiving a query 403, identifying a plurality of search terms in the query by decomposing the query 405, determining at least one match of the search terms to the lexical terms and determining a plurality of matches of the search terms to the document terms 406, and scoring each of the documents based on the at least one match to the lexical terms and the matches to the document terms 407.

According to at least one exemplary embodiment of the present invention, a lexicon is used to enhance a probability of recovering a relevant document(s) through any Language Model technique chosen by the user. According to at least one exemplary embodiment of the present invention, the lexicon is not directly related to the scoring scheme; by adding additional weight to collection terms flagged elsewhere by the user, the lexicon increases the probability of relevant documents being returned by the language model. According one or more embodiment of the present invention, a method of ranking documents adds additional mass to unobserved terms (in the documents) that are also in the lexicon.

According to at least one exemplary embodiment of the present invention, information is added to a smoothing process, the information increasing an emphasis on query terms that match the lexicon relative to unmatched terms. Exemplary embodiments of the present invention assume that these terms matter more to the user given the effort expended to include them. According to one or more embodiments of the present invention, a smoothing process uses a lexicon is emphasize unobserved terms as a function of a constant, which alters an impact of the unobserved terms as a function of document length.

According to at least one exemplary embodiment of the present invention, an existing ranking function is used in conjunction with a smoothing method adapted according to use a lexicon. In at least one exemplary embodiment of the present invention, a query is not manipulated, as may be the case in query expansion methods.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for information retrieval with a smoothing function using a lexicon. Further, a computer program product can include a tangible computer-readable recordable storage medium with code adapted to be executed to carry out one or more method steps described herein, including the provision of the system with the distinct software modules.

Figure 6:
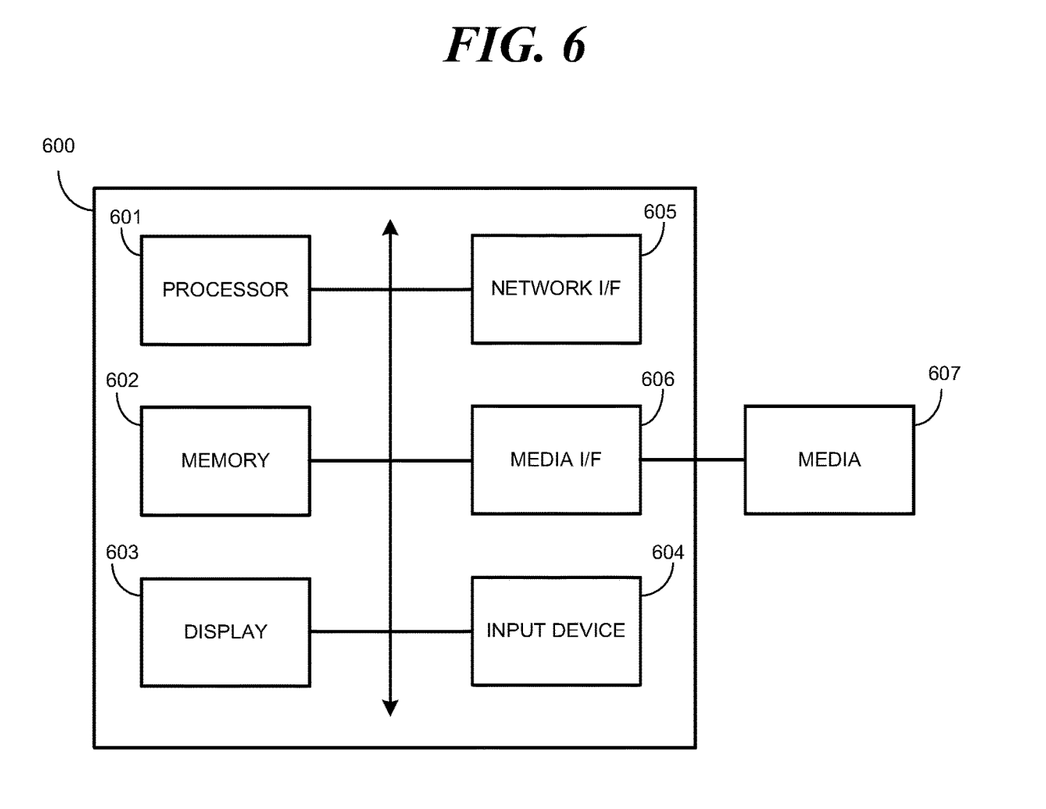
FIG. 6 is a block diagram depicting an exemplary computer system embodying a method for improved information retrieval according to an exemplary embodiment of the present invention.

Referring to FIG. 6; FIG. 6 is a block diagram depicting an exemplary computer system 500 embodying the computer system for information retrieval with a smoothing function using a lexicon. The computer system 600 shown in FIG. 6 includes a processor 601, memory 602, display 603, input device 604 (e.g., keyboard), a network interface (I/F) 605, a media I/F 606, and media 607, such as a signal source, e.g., camera, Hard Drive (HD), external memory device, etc.

In different applications, some of the components shown in FIG. 6 can be omitted. The whole system shown in FIG. 6 is controlled by computer readable instructions, which are generally stored in the media 607. The software can be downloaded from a network (not shown in the figures), stored in the media 607. Alternatively, software downloaded from a network can be loaded into the memory 602 and executed by the processor 601 to complete the function determined by the software.

The processor 601 may be configured to perform one or more methodologies described in the present disclosure, illustrative embodiments of which are shown in the above figures and described herein. Embodiments of the present invention can be implemented as a routine that is stored in memory 602 and executed by the processor 601 to process the signal from the media 607. As such, the computer system is a general-purpose computer system that becomes a specific purpose computer system when executing routines of the present disclosure.

Although the computer system described in FIG. 6 can support methods according to the present disclosure, this system is only one example of a computer system (e.g., agent system). Those skilled of the art should understand that other computer system designs can be used to implement embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of retrieving information comprising:
    obtaining access to a plurality of documents comprising document terms;
    receiving a lexicon including a plurality of lexical terms;
    receiving a query;
    identifying a plurality of search terms in the query by decomposing the query;
    determining at least one match of the search terms to the lexical terms;
    determining a plurality of matches of the search terms to the document terms; and
    scoring each of the documents based on the at least one match to the lexical terms and the matches to the document terms.

2. The method of claim 1, wherein scoring each of the documents further comprises adjusting a weighted score of a given one of the documents by a first value upon determining that the given document includes a given one of the search terms, by a second value upon determining that the given document omits the given one of the search terms and the given one of the search terms is contained in at least one of the documents, or by a third value upon determining the given document omits the given one of the search terms and the given one of the search terms is contained in at least one of the documents and contained in the lexicon.

3. The method of claim 2, wherein the first value is greater than the second value and the third value, and the third value is greater than the second value.

4. The method of claim 2, wherein the weighted score of a given one of the documents is adjusted for each of the plurality of matches of the search terms to the document terms of the given one of the documents.

5. The method of claim 2, further comprising determining a length of a given one of the documents and adjusting the third value of the given one of the documents according to the length of the given one of the documents.

6. The method of claim 2, further comprising outputting a ranked list of the documents using the weighted scores of the documents.

7. In a general purpose computer, a method for retrieving information into a memory of the general purpose computer, the method comprising:
    obtaining access to a plurality of documents comprising document terms;
    receiving a lexicon including a plurality of lexical terms;
    receiving a query;
    identifying a plurality of search terms in the query by decomposing the query;
    determining at least one match of the search terms to the lexical terms;
    determining a plurality of matches of the search terms to the document terms;
    scoring each of the documents based on the at least one match to the lexical terms and the matches to the document terms; and
    outputting a ranked list of the plurality of documents using the scoring of the documents.

8. The method of claim 7, wherein scoring each of the documents further comprises adjusting a weighted score of a given one of the documents by a first value upon determining that the given document includes a given one of the search terms, by a second value upon determining that the given document omits the given one of the search terms and the given one of the search terms is contained in at least one of the documents, or by a third value upon determining the given document omits the given one of the search terms and the given one of the search terms is contained in at least one of the documents and contained in the lexicon.

9. The method of claim 8, wherein the first value is greater than the second value and the third value, and the third value is greater than the second value.

10. The method of claim 8, wherein the weighted score of a given one of the documents is adjusted for each of the plurality of matches of the search terms to the document terms of the given one of the documents.

11. The method of claim 8, further comprising determining a length of a given one of the documents and adjusting the third value of the given one of the documents according to the length of the given one of the documents.

12. The method of claim 8, further comprising outputting a ranked list of the documents using the weighted scores of the documents.

13. A non-transitory computer readable medium comprising computer executable instructions which when executed by a computer cause the computer to perform a method of retrieving information, the method comprising:
    obtaining access to a plurality of documents comprising document terms;
    receiving a lexicon including a plurality of lexical terms;
    receiving a query;
    identifying a plurality of search terms in the query by decomposing the query;
    determining at least one match of the search terms to the lexical terms;
    determining a plurality of matches of the search terms to the document terms; and
    scoring each of the documents based on the at least one match to the lexical terms and the matches to the document terms.

14. The computer readable medium of claim 13, wherein scoring each of the documents further comprises adjusting a weighted score of a given one of the documents by a first value upon determining that the given document includes a given one of the search terms, by a second value upon determining that the given document omits the given one of the search terms and the given one of the search terms is contained in at least one of the documents, or by a third value upon determining the given document omits the given one of the search terms and the given one of the search terms is contained in at least one of the documents and contained in the lexicon.

15. The computer readable medium of claim 14, wherein the first value is greater than the second value and the third value, and the third value is greater than the second value.

16. The computer readable medium of claim 14, wherein the weighted score of a given one of the documents is adjusted for each of the plurality of matches of the search terms to the document terms of the given one of the documents.

17. The computer readable medium of claim 14, further comprising determining a length of a given one of the documents and adjusting the third value of the given one of the documents according to the length of the given one of the documents.

18. The computer readable medium of claim 14, further comprising outputting a ranked list of the documents using the weighted scores of the documents.

\* \* \* \* \*